Nov. 3, 1942.  M. W. HANKS  2,300,891
LIQUID CONDUCTOR HEATER
Filed April 25, 1941  3 Sheets-Sheet 1
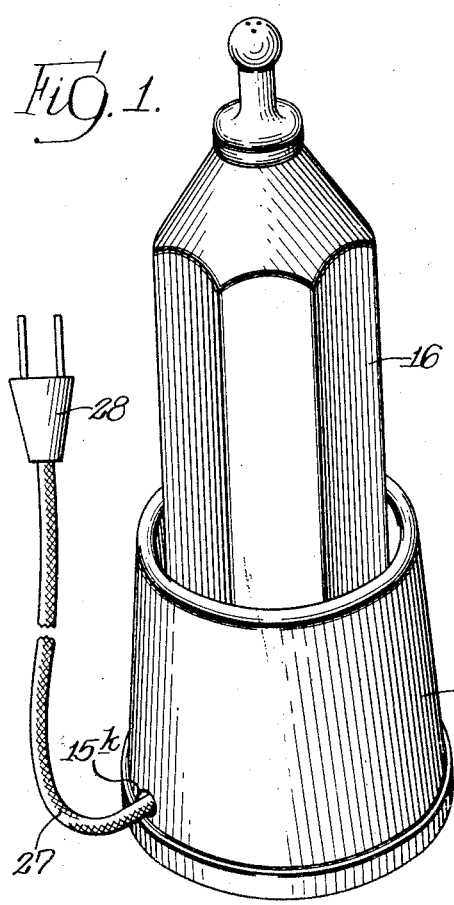
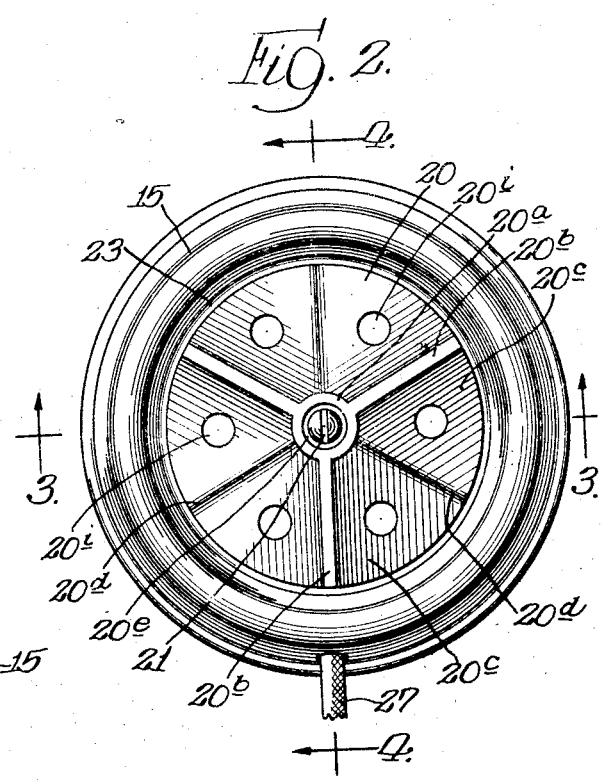
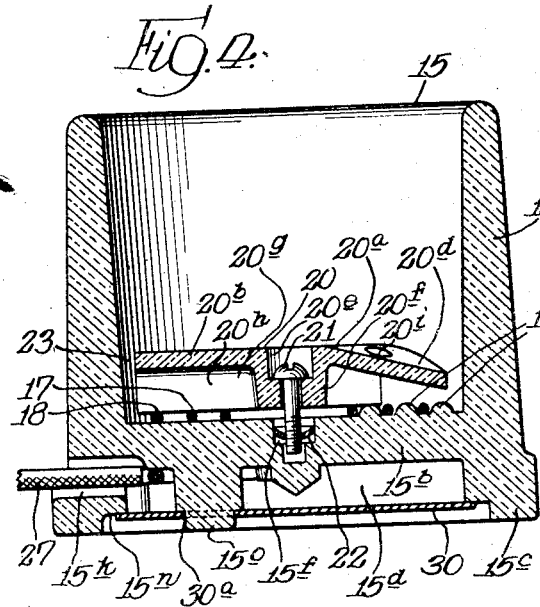
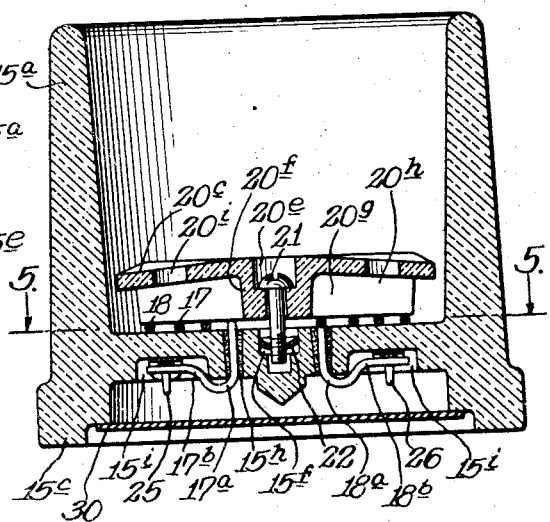
INVENTOR.
Marshall W. Hanks,
BY Davis, Lindsey, Smith & Shonts
Attys.

Nov. 3, 1942.  M. W. HANKS  2,300,891
LIQUID CONDUCTOR HEATER
Filed April 25, 1941  3 Sheets-Sheet 2
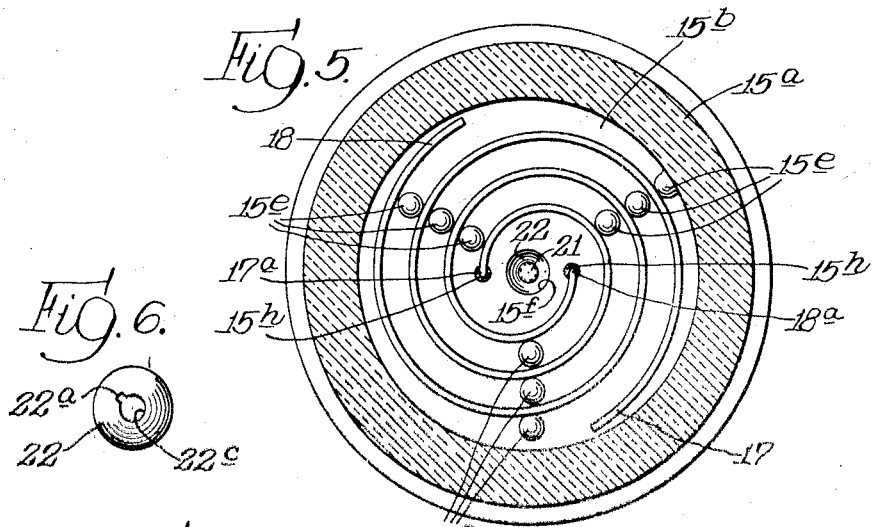
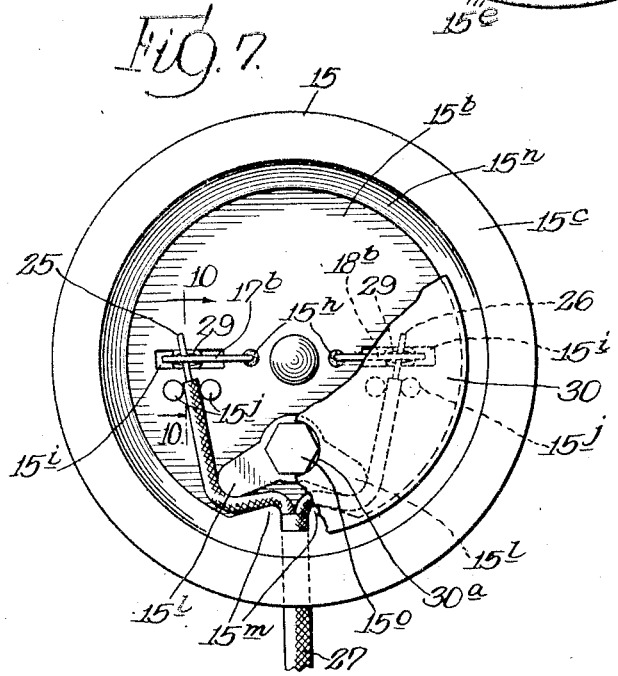
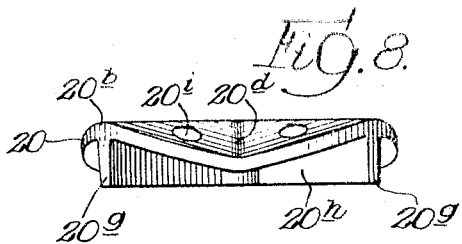
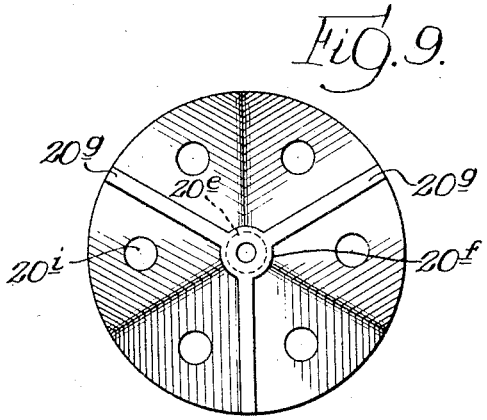
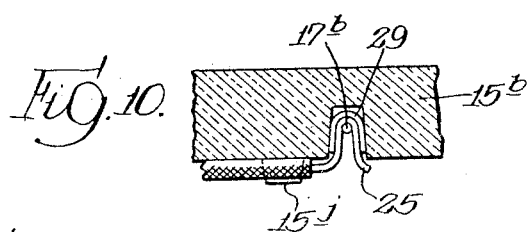
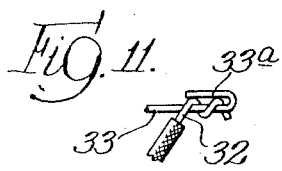
INVENTOR.
Marshall W. Hanks,
BY Davis, Lindsey, Smith & Shonts
Atty's.

Nov. 3, 1942.  M. W. HANKS  2,300,891
LIQUID CONDUCTOR HEATER
Filed April 25, 1941  3 Sheets-Sheet 3
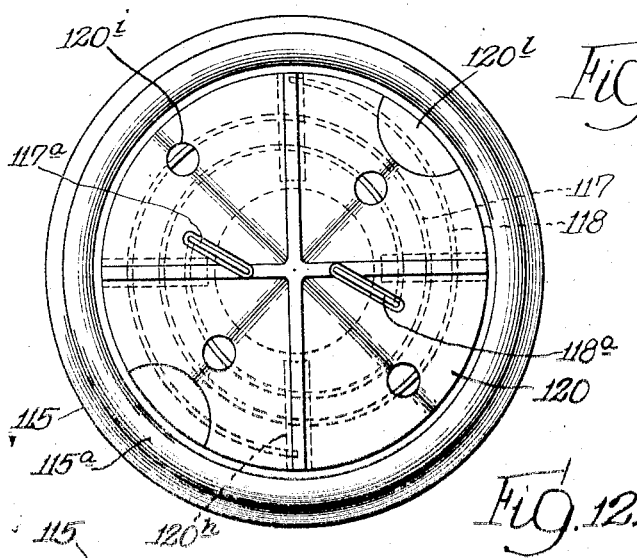
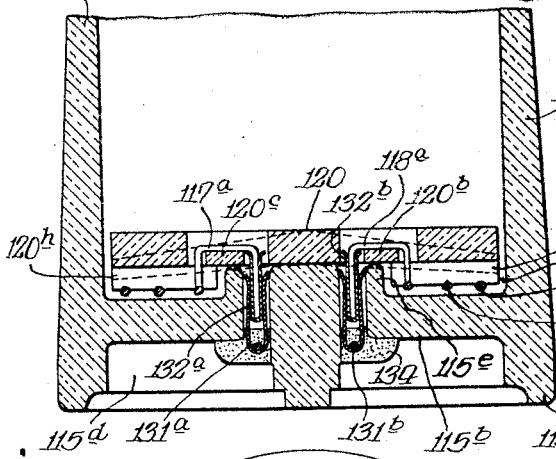
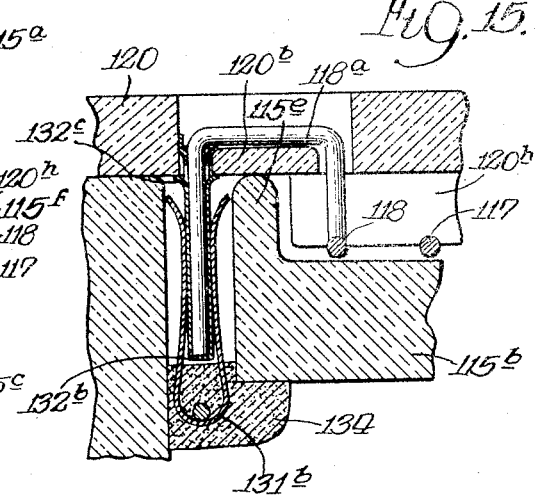
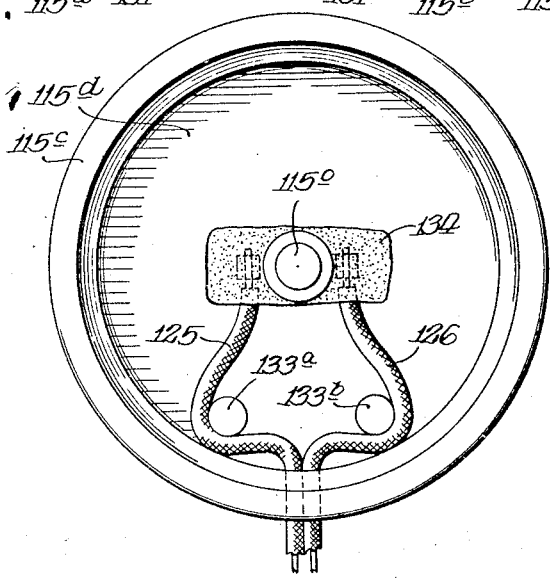
INVENTOR.
Marshall W. Hanks
BY Davis, Lindsey, Smith & Shonts
Attys.

Patented Nov. 3, 1942

2,300,891

UNITED STATES PATENT OFFICE 2,300,891

LIQUID CONDUCTOR HEATER

Marshall W. Hanks, Madison, Wis., assignor to Hankscraft Company, Madison, Wis., a corporation of Wisconsin Application April 25, 1941, Serial No. 390,261

16 Claims. (Cl. 219—40)

This invention relates to improvements in liquid conductor heaters of the type disclosed, for example, in the United States Patent No. 1,683,071 granted to Marshall W. Hanks and Max Mason on September 4, 1928, in which a pair of spaced electrodes connected in an electric circuit are located in a vessel of insulating material and connected by a measured quantity of water or other vaporizable liquid which is adapted to be evaporated to substantial dryness by the passage of current therethrough, thus giving the apparatus a substantially definite time period of operation. By suitably regulating the measured quantity of water which is put into the vessel, the duration of the operation of the apparatus may be varied as desired. The apparatus of the present invention may be used for warming a baby's milk bottle, or cooking eggs, or for heating or cooking various other objects for definite time periods which are automatically terminated by the evaporation of the water without attention on the part of the operator. This application is a continuation-in-part of copending application Serial No. 156,159, filed July 28, 1937, by the present applicant.

The principal object of the present invention is to provide an improved liquid conductor heater of the type above referred to which will be efficient in operation and which may be conveniently and economically constructed so that it may be supplied to the user at a comparatively low price.

A further object is to provide an improved construction and mounting of the spaced electrodes in a liquid conductor heater.

Still another object is to provide a liquid conductor heater comprising spaced electrodes which are held in place in a vessel by a clamping plate of insulating material which also serves to protect the fingers of the operator from contact with the electrodes.

Another object of the invention is to provide an insulating plate covering these electrodes of a liquid conductor heater and protecting the fingers of the operator from contact with the electrodes, which is provided with means for causing any liquid thereon to flow off to a point where it contacts the electrodes.

A further object is to provide a liquid conductor heater comprising a vessel having spaced electrodes mounted therein and having an insulating plate mounted over these electrodes and provided with a cavity forming a boiling space adjacent the electrodes.

Still another object of the invention is to provide improved means for conveniently connecting the electrodes of a liquid conductor heater in an electric circuit.

Another object is to provide improved means for conveniently and quickly attaching a name plate or cover plate to the vessel of a liquid conductor heater. Other objects relate to various features of construction and arrangement which will appear more fully hereinafter.

The nature of the invention will be understood from the following specification taken with the accompanying drawings in which the invention is illustrated. In the drawings, Figure 1 shows a perspective view of one form of the improved liquid conductor heater of the present invention, which is shown as being used for heating a baby's milk bottle;

Fig. 2 shows an enlarged top plan view of the liquid conductor heater shown in Fig. 1 with the milk bottle removed;

Fig. 3 shows a vertical section taken on the line 3—3 of Fig. 2;

Fig. 4 shows a vertical section taken on the line 4—4 of Fig. 2;

Fig. 5 shows a horizontal section taken on the line 5—5 of Fig. 3;

Fig. 6 shows an enlarged top plan view of the nut or washer which is engaged by a bolt by which the insulating plate is held above the electrodes;

Fig. 7 shows an enlarged bottom plan view of the electric conductor heater shown in Fig. 1 with a portion of the bottom cover plate or name plate removed;

Fig. 8 shows a side elevation of the insulating plate which is mounted over the electrodes;

Fig. 9 shows a bottom plan view of the insulating plate shown in Fig. 8;

Fig. 10 shows an enlarged vertical section on the line 10—10 of Fig. 7, illustrating the means of connecting the terminals of the electrodes with the conductors leading from a source of supply;

Fig. 11 is a side elevation of a modified form of the connection illustrated in Fig. 10;

Fig. 12 shows a side sectional view of a different embodiment of an improved liquid conductor heater constructed in accordance with the present invention;

Fig. 13 shows a top plan view of the heater shown in Fig. 12;

Fig. 14 shows a bottom plan view of the heater shown in Fig. 12 with the bottom cover plate removed; and Fig. 15 is an enlarged sectional view illustrating the details of the electrode mounting assembly utilized in the heater shown in Fig. 12.

Referring now more particularly to Figs. 1 to 11, inclusive, of the drawings, the embodiment of the invention there illustrated comprises a vessel 15 formed of porcelain or other suitable insulating material which is adapted to receive the article or object to be heated or cooked. In this instance, a baby's milk bottle 16 is shown mounted in the cavity of the vessel. The vessel 15 has an outer annular wall 15$^a$, a bottom wall 15$^b$, and a lower annular flange or base portion 15$^c$ adapted to rest upon a table or other support and forming a bottom cavity 15$^d$ in which connections are established with a pair of spaced electrodes 17 and 18 which are located in the bottom of the vessel, resting on the bottom wall 15$^b$. The electrodes 17 and 18 are preferably formed as bare round wires of conducting material which are wound in spiral fashion and located one within the other so that convolutions of one electrode are located on opposite sides of each convolution of the other electrode. The convolutions of the separate electrodes are maintained in place laterally on the bottom wall 15$^b$ and are spaced from adjacent convolutions of the other electrode by means of projections 15$^e$ which are formed integrally with the bottom wall 15$^b$ and which project upwardly therefrom. These projections 15$^e$ are preferably arranged in rows extending radially outward from the center of the vessel as shown in Fig. 5.

The electrodes 17 and 18 are held in place on the bottom wall 15$^b$ by means of an insulating plate 20 formed of porcelain or other suitable insulating material which rests upon the upper edges of the electrodes and which is secured in place by a bolt 21 engaging a nut 22 which is located in a recess 15$^f$ formed in the upper surface of the bottom wall 15$^b$. The nut 22 is preferably in the form of a flat spring washer as shown in Fig. 6, being notched on one side as shown in 22$^a$. This washer is of a diameter slightly greater than the diameter of the upper part of the circular recess 15$^f$ in the bottom wall of the vessel, and the central aperture 22$^c$ in this washer is of a diameter such that it fits the bottom of the spaces between the threads of the bolt, so that the washer forms a one-thread nut. When this washer is pushed downwardly into the recess 15$^f$, it assumes a downwardly convexed shape and is retained in the recess by the engagement with the wall thereof and the extremity of the bolt 21 may be threaded into engagement therewith to hold the insulating plate 20 in tight engagement with the electrodes 17 and 18 so that these electrodes are clamped against the bottom wall of the vessel.

The insulating cover plate 20 is provided on its upper side with a central annular surface 20$^a$ and three outwardly radiating surfaces 20$^b$ which are horizontal and which are adapted to be engaged by the bottom of the milk bottle 16. The portions of the insulating plate between the horizontally radiating flat portions 20$^b$ are inclined downwardly as shown at 20$^c$, forming radiating troughs 20$^d$. These troughs are inclined downwardly and outwardly so that any water or other vaporizable liquid on the upper surface of the insulating plate is directed downwardly by gravity and flows from the troughs 20$^d$ to the bottom of the vessel where it engages the spaced electrodes 17 and 18. This is of particular importance when the apparatus is being operated with a relatively small quantity of water or other liquids, as it is desirable that all portions of this liquid reach the electrodes to be heated and vaporized, thus giving the apparatus a definite time period of operation. The head of the bolt 21 is located in a central recess or depression 20$^e$ formed in the upper side of the insulating plate and the stem of the bolt extends through a central boss 20$^f$ from which three flanges or arms 20$^g$ extend radially outward, being united integrally with the under side of the body of the plate. These flanges or arms 20$^g$ are preferably located directly beneath the flat portions 20$^b$ upon which the bottle 16 rests, and the lower edges of these flanges 20$^g$ are adapted to engage the upper edge portions of the electrodes 17 and 18 which are thus clamped between the flanges and the bottom wall 15$^b$ of the vessel. The flanges or arms 20$^g$ thus form the cavities 20$^h$ which are open at their outer ends and which serve as boiling spaces immediately above the electrodes so that there is a free opportunity for bubble formation as the liquid in the vessel is heated and vaporized. The plate 20 is preferably slightly less in diameter than the internal diameter of the lower portion of the cavity of the vessel 15 so that there is an annular space 22 around the outer edge of the plate 20 to permit the upward escape of bubbles which are produced by the heating of the liquid. In addition, the ready escape of these bubbles is insured by the provision in the body portion of the plate 20 of a number of apertures 20$^i$ which are preferably located in the inclined portions 20$^c$ of the troughs, as shown in Fig. 2.

The electrodes 17 and 18 are connected in a supply circuit by having portions 17$^a$ and 18$^a$ thereof, respectively, led downwardly through apertures 15$^h$ which are formed in the bottom wall of the vessel. After inserting these portions of the electrodes through the apertures 15$^h$, the apertures may be sealed by any suitable waterproof cement which is adapted to withstand any heat which may be generated by the passage of current through the electrodes. If desired, portions of rubber tubing may be inserted around the electrodes in the apertures before applying the cement. The extremities of the electrodes are connected to supply conductors 25 and 26 which are surrounded by insulation to form a common flexible cord 27 having at the end thereof a fitting 28, as shown in Fig. 1, which permits the connection of the conductors 25 and 26 in an electric circuit. In order to connect the extremities of the electrodes with the conductors 25 and 26, which have the insulation removed from the inner ends thereof, without the use of screws or other usual fastening means, the bottom wall 15$^b$ of the vessel is provided on its underside with a pair of elongated grooves or recesses 15$^i$ which have their side walls tapered upwardly. The bare extremities of the conductors 25 and 26 are laid across these grooves and then, after placing the extremities 17$^b$ and 18$^b$ of the electrodes transversely across these extremities of the supply conductors, these portions 17$^b$ and 18$^b$ of the electrodes are pushed upwardly into the grooves 15$^i$, thereby forming U-shaped bends in the extremities of the conductors 25 and 26, as shown in Fig. 10, and causing these conductors to be held in frictional engagement with the extremities of the electrodes. In order to compensate for various diameters of the wires and electrodes which may be employed with a particular vessel 15, shims 29 of any suitable material may be placed above the conductors 25 and 26 before the parts are pushed into the grooves 15ˡ, as shown in Fig. 10, and the shims may be selected of any suitable thickness to cause a tight wedging fit when the parts have been pushed into the grooves. The conductors 25 and 26 may be prevented from shifting laterally adjacent the grooves 15ˡ by providing bosses 15ʲ on the under side of the bottom wall 15ᵇ of the vessel, as shown in Fig. 7. For the purpose of locking the insulated portions of the conductors 25 and 26 to prevent any tension created in the cord 27 from being transmitted to the connections which have been formed between the conductors and the electrodes, the conductors 25 and 26 are bent transversely at a point adjacent the aperture 15ᵏ through which the cord 27 is brought through the base flange 15ᶜ of the vessel, and the bottom wall of the vessel is provided with a locking lug 15ˡ which is formed integrally with the bottom wall and which has outwardly diverging arms adapted to maintain a sharp bend in each of the conductors 25 and 26 about the projections 15ᵐ which are formed on the inner margin of the base flange 15ᶜ, as shown in Fig. 7.

The connections of the supply conductors with the electrodes are preferably concealed by a cover plate 30, formed of suitable sheet metal or the like, which seats against the annular shoulder 15ⁿ which is formed on the inner portion of the base flange of the vessel. In order that this cover plate may be secured to the vessel without the use of screws or other usual fastening means, the base of the vessel is provided with a projecting boss 15º adapted to engage an aperture 30ᵃ formed in the cover plate 30. The boss 15º may be located anywhere on the base above the cover plate, but in this instance it is formed as an extension of the lugs 15ˡ and is hexagonal in cross section so that it has corners which are adapted to bite into the metal on the edges of the circular aperture which is formed in the cover plate. This aperture 30ᵃ is of such size that when the cover plate is driven upwardly over the boss the metal will interlock with the porcelain of the boss 15º and thus hold the cover plate in place. This cover plate may serve as a name plate for the manufacturer and also to carry printed directions for the operation of the apparatus.

In Fig. 11, there is shown a simple form of connection which may be used as a substitute for the connection shown in Fig. 7 to attach the supply conductors to the electrodes. With this arrangement, a supply conductor 32 has its extremity twisted around the end of an electrode 33 and the extremity of this electrode is reversely bent as shown at 33ᵃ to enclose the twisted portion of the conductor.

The second embodiment of the invention as illustrated in Figs. 12 to 15, inclusive, of the drawings is substantially similar in construction and arrangement with the first embodiment of the invention as described above. Briefly described, the second embodiment of the invention comprises a vessel 115 formed of molded porcelain or other suitable insulating material, which is provided with an outer annular wall 115ᵃ, a bottom wall 115ᵇ, and a lower annular flange or base portion 115ᶜ. The bottom wall 115ᵇ and the flanged portion 115ᶜ define a bottom cavity 115ᵈ within which connections are established with a pair of pin receiving sockets 131ᵃ and 131ᵇ. The sockets 131ᵃ and 131ᵇ are adapted to receive and grip a pair of contact pins 132ᵃ and 132ᵇ which electrically terminate the respective inner ends of the two electrodes 117 and 118. These two electrodes are interposed between the upper surface of the bottom wall 115ᵇ and the under surface of a supporting member 120 which is also formed of molded porcelain or other suitable insulating material. More specifically, the electrodes 117 and 118, which may be formed of bare round wires or ribbon stock of conducting material, are wound in spiral fashion one within the other, and the intermeshed convolutions thereof are secured to the under surface of the supporting member 120. To this end, the member 120 is provided with an under surface which includes four integrally formed separating elements in the form of downwardly projecting ribs 120ʰ. These ribs extend radially outward from the center of the member 120 and adjacent ones thereof are normal to each other. In order to space the convolutions of the electrodes 117 and 118 apart along the ribs 120ʰ, transversely extending slots may be formed in the under surface of the ribs into which the electrodes may be wedged or otherwise secured. Alternatively, the electrodes may be imbedded in the ribs with the convolutions thereof suitably spaced apart, during the molding of the member 120. The inner ends of the electrodes 117 and 118 are each looped through two openings provided in the member 120 in order to securely hold the electrodes on the under surface of this member. More specifically, the electrode 118 is provided with a substantially U-shaped inner end portion 118ᵃ which encircles the portion 120ᵇ of the member 120. The electrode 117 is similarly provided with a substantially U-shaped inner end 117ᵃ which is looped over the portion 120ᶜ of the member 120. The inner legs of the U-shaped electrode portions 117ᵃ and 118ᵃ extend into and are soldered to the pin connectors 132ᵃ and 132ᵇ, respectively. These pins connectors are rigidly secured to the insulating member 120 in any desired manner, although preferably the arrangement shown in Fig. 15 is used. As there shown, the connector 132ᵇ is provided with an enlarged base which seats in the hole of the member 120 through which the inner leg of the electrode portion 118ᵃ extends. The right top side of this base portion is spun over to engage the upper surface of the ledge 120ᵇ. Four small fingers 132ᶜ bent out from the stem of the connector are provided which engage the under side of the member 120. It will be noted from the above explanation that the base legs of the U-shaped end portions 117ᵃ and 118ᵃ of the two electrodes lie in deep narrow channels formed in the upper surface of the insulating member 120. It will also be noted that the electrodes are entirely covered by the insulating member 120. This arrangement precludes the possibility of a user of the apparatus coming in contact with the electrodes.

The two sockets 131ᵃ and 131ᵇ are U-shaped in contour, are relatively wide as compared with the diameter of the pin connectors 132ᵃ and 132ᵇ, and are constructed of spring metal such as bronze strip. These two sockets are soldered to the two bare ends of the cord conductors 125 and 126, respectively. These conductors are sharply looped around strain posts 133ᵃ and 133ᵇ, which are suitably secured to the under side of the bottom wall 115ᵇ and which prevent the conductor ends from being pulled out of the sockets 132ᵃ and 132ᵇ. The two sockets are rigidly held in place by cementing the same to the bottom wall of the vessel at 134 in the manner illustrated, thus providing a liquid tight seal over the bottom ends of the two holes in which the sockets are disposed.

As best shown in Fig. 12 of the drawings, the inner central portion of the bottom wall 115ᵇ is provided with a raised portion 115ᵉ. Between this portion of the vessel and the outer wall 115ᵃ thereof, an annular liquid receiving well 115ᶠ is defined. This well is of the correct dimensions to receive the radially extending ribs 120ʰ upon which the two electrodes 117 and 118 are mounted. The raised portion 115ᵉ of the bottom wall 115ᵇ is adapted to engage the central under surface of the insulating member 120 for the purpose of supporting this member. Preferably, the dimensions are such that the ribs 120ʰ and the electrodes carried thereby are slightly above the upper surface of the bottom wall 115ᵇ.

The upper or supporting surface of the insulating member 120 is preferably identical in contour with that of the insulating member 120 forming a part of the first described embodiment of the invention, except that four troughs are provided therein instead of the three troughs used in the construction shown in Figs. 1 to 11, inclusive. In order to facilitate removal of the member 120 from the vessel 115, two finger receiving notches 120ⁱ are provided in the upper surface thereof. The member 120 is preferably slightly less in diameter than the internal diameter of the lower portion of the cavity of the vessel 115 so that an annular space is provided around the outer edge of the member which permits the upward escape of bubbles that are produced by the heating of the liquid. In addition, the ready escape of these bubbles is insured by providing in the body portion of the plate a number of apertures 120ⁱ which are preferably located in the inclined portions of the troughs, as shown in Fig. 13 of the drawings.

Although two embodiments of the invention have been shown and described by way of illustration, together with a modification of the connection between the electrodes and the supply conductors, it will be understood that the invention may be constructed in various other embodiments which come within the scope of the appended claims.

I claim:

1. A liquid conductor heater comprising a vessel adapted to contain a measured quantity of liquid, a pair of spaced electrodes in said vessel adapted to be connected by said liquid, and an insulating member mounted over said electrodes and having an upper surface provided with flat horizontal portions and intervening downwardly and outwardly sloping portions to permit said liquid to flow therefrom.

2. A liquid conductor heater comprising a vessel adapted to contain a measured quantity of liquid, a pair of spaced electrodes in said vessel adapted to be connected by said liquid, and an insulating member mounted over said electrodes and having horizontal outwardly radiating portions arranged alternately with downwardly and outwardly sloping portions.

3. A liquid conductor heater comprising a vessel adapted to contain a measured quantity of liquid, a pair of spaced electrodes in said vessel adapted to be connected by said liquid, and an insulating member mounted in and secured to said vessel to hold said electrodes in position, said insulating member having a cavity therein adjacent said electrodes.

4. A liquid conductor heater comprising a vessel adapted to contain a measured quantity of liquid, a pair of spaced electrodes mounted in said vessel and adapted to be connected by said liquid, and an insulating member mounted over said electrodes and having downwardly extending outwardly radiating flanges on its under side engaging said electrodes to hold them in place, said flanges spacing the body portion of said insulating member from said electrodes to provide boiling spaces.

5. A liquid conductor heater comprising a vessel adapted to contain a measured quantity of liquid, a pair of spaced electrodes mounted in said vessel and adapted to be connected by said liquid, and an insulating member mounted over said electrodes and having downwardly extending outwardly radiating flanges on its under side engaging said electrodes to hold them in place, said flanges spacing the body portion of said insulating member from said electrodes to provide boiling spaces, said insulating member having apertures therethrough between said flanges.

6. A liquid conductor heater comprising a vessel adapted to contain a measured quantity of liquid, a pair of spaced electrodes mounted in said vessel and adapted to be connected by said liquid, and an insulating member mounted over said electrodes and having downwardly extending outwardly radiating flanges on its under side engaging said electrodes to hold them in place, said flanges spacing the body portion of said insulating member from said electrodes to provide boiling spaces, said insulating member being of lesser area than the chamber of said vessel.

7. A liquid conductor heater comprising a vessel of insulating material adapted to contain a measured quantity of liquid, said vessel having a bottom wall, a pair of electrodes arranged in spiral fashion on said bottom wall within said vessel and having their convolutions spaced from each other, an insulating member mounted over and resting on said electrodes to hold them in position, and means for securing said insulating member to said bottom wall.

8. A liquid conductor heater comprising a vessel of insulating material provided with a bottom wall having upwardly extending lugs formed thereon, a pair of electrodes arranged in spiral fashion on the said bottom wall and having their convolutions spaced from adjacent convolutions by said lugs, an insulating member having parts thereof resting on both of the said electrodes, and means for securing said insulating member in position.

9. A liquid conductor heater comprising a vessel of insulating material having a bottom wall, spaced electrodes mounted on said bottom wall, an insulating member mounted over said electrodes, said bottom wall having a recess therein, a thin metal washer mounted in said recess, and a threaded member passing through said insulating member and engaging said washer.

10. A liquid conductor heater comprising a vessel of insulating material having a bottom wall provided with a recess therein, electrodes mounted in the bottom of said vessel, an insulating member mounted over said electrodes, a metal washer of larger area than the said recess pressed into said recess, and a bolt engaging said insulating member and threaded into engagement with said washer.

11. A liquid conductor heater comprising a vessel of insulating material having a bottom wall provided with an aperture therethrough and with a groove in the under side of said bottom wall, an electrode mounted in said vessel and having a part extending through said aperture, a supply conductor having an extremity extending transversely to the extremity of said electrode, said conductor and said electrode being pressed into said groove to force them into tight wedging engagement with each other.

12. A liquid conductor heater comprising a vessel of insulating material, a pair of spaced electrodes mounted in said vessel and having extremities extending through the bottom of said vessel, a pair of supply conductors having connections with the extremities of said electrodes beneath said vessel, said vessel being provided with integral projections adapted to engage opposite sides of and bend said conductors to cause longitudinal strains on said conductors to be received by said vessel independently of said connections.

13. A liquid conductor heater comprising a vessel of insulating material, a pair of electrodes mounted in said vessel, supply conductors, said supply conductors having connections with said electrodes beneath the bottom wall of said vessel, said vessel having a base flange extending downwardly from said bottom wall around said connections, and a cover plate seated against parts of said base flange, said vessel having an integral projecting lug, said cover plate having an aperture adapted to form an interlocking connection with said lug on said vessel to hold said cover plate in position independently of other fastening means.

14. A liquid conductor heater comprising a vessel formed of insulating material and provided with a bottom wall, a member supported by the bottom wall of said vessel and adapted to support objects disposed within said vessel for heating, a pair of electrodes comprising spirally arranged spaced apart convolutions interposed between the upper surface of said bottom wall and the under surface of said member and contacting one of said surfaces, said member being formed of insulating material and being shaped entirely to cover the convolutions of said electrodes, thereby positively to prevent a user of said heater from contacting said electrodes, and means for securing said electrodes to said one surface.

15. A liquid conductor heater comprising a vessel formed of insulating material and provided with a bottom wall, a member supported by the bottom wall of said vessel and adapted to support objects disposed within said vessel for heating, a pair of electrodes comprising spirally arranged spaced apart convolutions interposed between the upper surface of said bottom wall and the under surface of said member, said member being formed of insulating material and being shaped entirely to cover the convolutions of said electrodes, thereby positively to prevent a user of said heater from contacting said electrodes, one of said surfaces being provided with integrally formed separating elements for maintaining the spacing between the convolutions of said electrodes, and means for mounting said electrodes upon said one surface.

16. A liquid conductor heater comprising a vessel formed of insulating material and provided with a bottom wall, a pair of electrodes comprising spaced apart spirally arranged convolutions disposed within said vessel adjacent the upper surface of said bottom wall, a member having an under surface contacting said convolutions and being adapted to support objects disposed within said vessel for heating, said member being formed of insulating material and being shaped entirely to cover the convolutions of said electrodes, thereby positively to prevent a user of said heater from contacting said electrodes, means including separating elements integral with at least a portion of one of said surfaces for holding the convolutions of said electrodes on said one surface in spaced apart relation, and means for detachably securing said member to the bottom wall of said vessel.

MARSHALL W. HANKS.